United States Patent
Foley et al.

(10) Patent No.: US 11,578,219 B2
(45) Date of Patent: *Feb. 14, 2023

(54) SPHERICAL PARTICLES FOR PREPARING COLORED COATINGS

(71) Applicant: BASF SE, Ludwigshafen am Rhein (DE)

(72) Inventors: Nicholas A. Foley, Charlotte, NC (US); Christopher J. Valovic, Charlotte, NC (US); Rupa Hiremath Darji, Tarrytown, NY (US)

(73) Assignee: BASF SE

( * ) Notice: Subject to any disclaimer, the term of this patent is extended or adjusted under 35 U.S.C. 154(b) by 0 days.

This patent is subject to a terminal disclaimer.

(21) Appl. No.: 16/817,179

(22) Filed: Mar. 12, 2020

(65) Prior Publication Data

US 2020/0291250 A1 Sep. 17, 2020

Related U.S. Application Data

(60) Provisional application No. 62/817,264, filed on Mar. 12, 2019.

(51) Int. Cl.
| | | |
|---|---|---|
| *C09D 7/00* | (2018.01) | |
| *C09D 7/40* | (2018.01) | |
| *C09D 5/32* | (2006.01) | |
| *C08J 9/32* | (2006.01) | |
| *C08K 7/22* | (2006.01) | |
| *C08K 7/24* | (2006.01) | |

(52) U.S. Cl.
CPC ...... *C09D 7/70* (2018.01); *C08J 9/32* (2013.01); *C08K 7/22* (2013.01); *C09D 5/32* (2013.01); *C09D 7/69* (2018.01); *C08K 7/24* (2013.01); *C08K 2201/005* (2013.01)

(58) Field of Classification Search
CPC ..... C09D 5/32; C09D 7/69; C09D 7/70; C08J 9/32; C08K 7/22; C08K 7/24; C08K 2201/005

See application file for complete search history.

(56) References Cited

U.S. PATENT DOCUMENTS

| | | |
|---|---|---|
| 5,342,876 A | 8/1994 | Abe et al. |
| 2019/0076809 A1 | 3/2019 | Darji et al. |
| 2019/0076810 A1 | 3/2019 | Darji et al. |

FOREIGN PATENT DOCUMENTS

| | | |
|---|---|---|
| JP | 02-139656 | 6/1989 |
| WO | 2019/051353 A1 | 3/2019 |
| WO | 2019/051357 A1 | 3/2019 |

OTHER PUBLICATIONS

U.S. Appl. No. 16/817,173 (Year: 2020).*

* cited by examiner

*Primary Examiner* — Edward J Cain
(74) *Attorney, Agent, or Firm* — Faegre Drinker Biddle & Reath LLP

(57) ABSTRACT

Colored coating compositions comprising a polymer binder and a sphere selected from porous metal oxide spheres formed from metal oxide particles and having an average porosity of from 0.10 to 0.90; polymer spheres formed from a multimodal distribution of polymer particles; or mixtures thereof, wherein the colored coating composition when dried, exhibits visible light absorbance at a wavelength range from 400 nm to 800 nm. The sphere has an average particle size diameter of from 1 micron to 5 microns, or from 3 microns to 5 microns and exhibits a structural color which may be angle-dependent or angle-independent.

20 Claims, No Drawings

SPHERICAL PARTICLES FOR PREPARING COLORED COATINGS

CROSS REFERENCE TO RELATED APPLICATIONS

This application claims priority to U.S. Provisional Patent Application No. 62/817,264, entitled "Spherical Particles for Preparing Colored Coatings," filed Mar. 12, 2019, the content of which is herein incorporated by reference in its entirety.

FIELD OF THE DISCLOSURE

The present disclosure relates to colored coating compositions, particularly to colored coating compositions comprising spheres.

BACKGROUND

Color is one of the most important aspects of printing inks and paints. Printing inks are used for generating images and text on a variety of consumer and industrial goods. A primary function of the image and text is to identify and differentiate the printed object. The value of image and text can be directly related to the quality of the image including its color. One of the primary purposes of paints is also to provide a specific color to the underlying substrate. The value of a paint can also be directly related to its ability to provide a specific color.

Numerous mechanisms for the generation of color have been identified. These mechanisms are categorized into those that are caused by atomic excitations, ligand field effects, molecular orbital transitions, band transitions, or phenomena occurring due to geometric or physical causes. Of all these mechanisms, the use of color by humans has traditionally been dominated by materials that harness the effects of electronic transitions. Specifically, the color of a printing ink and paint is primarily derived from pigments or dyes that use color mechanisms that selectively subtract specific parts of the visible spectrum through electronic transitions and reflect or transmit the remaining visible wavelengths. A majority of the objects in our world follow this mechanism, where color is dictated by the selective absorbance of light. This subtractive color mechanism is distinct from colors that arise from the mixing of colored light, called 'additive color'. Additive coloration is used in display systems such as monitors and televisions in which numerous colored pixels are selectively activated to combine specific colored emissions into a desired final color. In this case, photons are not being selectively absorbed but, rather, narrow band emissions of specific wavelengths of photons are responsible for the perceived color. The emitted color wavelengths from each individual source add together to form the final color.

There is a need to formulate coatings which have improved wavelength selective scattering particles. The compositions and methods described herein address these and other needs.

SUMMARY OF THE DISCLOSURE

Colored coating compositions comprising a polymer binder and a sphere (e.g., microsphere) selected from porous metal oxide spheres (e.g., microsphere) formed from metal oxide particles (e.g., nanoparticles) and having an average porosity of from 0.10 or 0.30 to 0.80 or 0.90; polymer spheres (e.g., microspheres) formed from a multimodal distribution of polymer particles (e.g., nanoparticles); or mixtures thereof, are described herein. The sphere can have an average particle size diameter of from 1 micron to 20 microns, e.g., from 1 micron to 10 microns, from 1 micron to 5 microns, or from 3 microns to 5 microns. The problem solved with the use of the sphere includes enhancement of the color characteristics of the colored coating compositions. In particular, the sphere exhibits a structural color which may be angle dependent or angle independent. The colored coating compositions comprising the spheres when dried, can exhibit a visible light absorbance at a wavelength range from 400 nm to 800 nm.

The polymer binder present in the colored coating compositions can comprise a polymer selected from acrylic homopolymers, styrene-acrylic-based copolymers, styrene-butadiene-based copolymers, styrene-butadiene-styrene block copolymers, vinyl acrylic-based copolymers, ethylene vinyl acetate-based copolymers, polychloroprene, alkyd resin, polyester resins, polyurethane resins, silicone resins, petroleum resins, epoxy resins, or blends thereof. The polymer binder can be present in an amount of from greater than 0% to 99.9% by weight, or from 5% to 99.9% by weight, or from 10% to 95% by weight, based on a dry weight of the colored coating composition.

As described herein, the sphere in the colored coating compositions can be selected from porous metal oxide spheres, polymer spheres, or mixtures thereof. In some examples, the colored coating compositions comprise the porous metal oxide spheres. The porous metal oxide spheres can have an average porosity of from 0.20 to 0.70, from 0.40 to about 0.65, or from 0.45 to about 0.55. The porous metal oxide spheres can have a unimodal or multimodal (such as a bimodal) distribution of pore sizes. The average pore diameter of the porous metal oxide spheres can be from 200 nm to 800 nm, from 200 nm to 400 nm, or from 250 nm to 350 nm. The porous metal oxide spheres comprise from 60% to 99.9% by weight metal oxide, based on a total weight of the porous metal oxide spheres. The metal oxide can be selected from the group consisting of silica, titania, alumina, zirconia, ceria, iron oxides, zinc oxide, chromium oxide and combinations thereof, such as titania or silica.

In other examples, the colored coating compositions comprise the polymer spheres. The polymer spheres are formed from a polymodal, such as a bimodal, distribution of polymer particles. The polymer spheres can comprise a polymer selected from the group consisting of poly(meth)acrylic acid, poly(meth)acrylates, polystyrenes, polyacrylamides, polyethylene, polypropylene, polylactic acid, polyacrylonitrile, blends thereof, salts thereof, and copolymers thereof.

The colored coating compositions can further comprise one or more pigments or fillers, for example, pigments or fillers selected from clay, kaolin, mica, titanium dioxide, talc, natural silica, synthetic silica, natural silicates, synthetic silicates, feldspars, nepheline syenite, wollastonite, diatomite, barite, glass, and calcium carbonate, bentonite, attapulgite, zeolite, or mixtures thereof. The one or more pigments or fillers can be present in an amount such that the sphere and one or more pigments or fillers make up from greater than 0% to 90% by weight, or from 0.1% to 60% by weight, based on a total weight of the colored coating composition. In some examples, the colored coating compositions do not include a pigment or filler, other than the spheres.

The colored coating compositions can further include a pigment dispersant, an inorganic or organic filler, a pigment extender, an adhesion enhancer, a film forming aid, a defoamer, a thickener, a light stabilizer, a wetting agent, a biocide, a tackifier, or a combination thereof.

In specific examples, the colored coating can be an architectural colored coating composition. The architectural colored coating composition can comprise a polymer binder; and a sphere selected from porous metal oxide spheres formed from metal oxide particles and having an average porosity of from 0.10 to 0.80 or from 0.10 to 0.90; polymer spheres formed from a multimodal distribution of polymer particles; or mixtures thereof, wherein the sphere has an average particle size diameter of from 1 micron to 20 microns, e.g., from 1 micron to 10 microns, from 1 micron to 5 microns, or from 3 microns to 5 microns and exhibits a structural color visible to the human eye, and wherein the architectural colored coating composition when dried, exhibits visible light absorbance at a wavelength range from 400 nm to 800 nm.

In other specific examples, the colored coating can include a polymer selected from acrylic homopolymers, styrene-acrylic-based copolymers, styrene-butadiene-based copolymers, styrene-butadiene-styrene copolymers, vinyl acrylic copolymers, ethylene vinyl acetate copolymers, polychloroprene, alkyd resin, polyester resins, polyurethane resins, silicone resins, petroleum resins, epoxy resins, blends thereof, or copolymers thereof; and a sphere selected from porous metal oxide spheres formed from metal oxide particles, polymer spheres formed from a multimodal distribution of polymer particles, or a mixture thereof, and wherein the sphere has an average particle size diameter of from 1 micron to 20 microns, e.g., from 1 micron to 10 microns, from 1 micron to 5 microns, or from 3 microns to 5 microns and exhibits an angle-independent structural color.

Coatings and films formed from the colored coating compositions are also disclosed. The coating compositions can be in the form of an ink or an architectural coating, such as a paint. The paint can be an aqueous based paint or an oil-based paint, such as selected from an industrial paint or an architectural paint for interior and exterior applications. The films can have a thickness of from 0.5 to 500 microns, from 5 to 75 microns, or from 0.5 to 30 microns, after drying. In certain embodiments, the films can exhibit a UV reflectance at a wavelength from 100 nm to 400 nm of at least 10%, at least 20%, at least 40%, or at least 50%. In other embodiments, the films can exhibit an IR reflectance at a wavelength from 800 nm to 10 μm, from 800 nm to 5 μm, from 800 nm to 2.5 μm, or from 800 nm to 1 μm, of at least 10%, at least 20%, at least 40%, at least 50%. In further embodiments, the films having a thickness of 75 microns, exhibit a contrast ratio of at least 90%, or at least 96%.

The details of one or more embodiments are set forth in the description below. Other features, objects, and advantages will be apparent from the description and from the claims.

DETAILED DESCRIPTION

This disclosure is based on the discovery that enhancement in the color of coating compositions can be obtained using spheres (e.g., microspheres) that are structurally colored. The terms "structurally colored" or "structural colorants" can be used interchangeably and refer to spheres that form colors due to their structural morphology rather than molecular properties. In particular, the spheres exhibit color via light interference effects, relying on microscopically structured surfaces small enough to interfere with visible light and produce color as opposed to its chemical structure.

The colors that result from this mechanism can be selected by alterations to the structure of a chosen material, allowing one material to exhibit various colors throughout the visible spectrum with no change to the chemical nature of the material itself. The creation of these structural spheres through a sacrificial templating procedure or colloidal dispersion procedure and their optimization for color is discussed herein.

The spheres described herein can exhibit high stability and thus can be formulated into colored coating compositions as a replacement for less stable and/or less environmentally friendly pigments or dyes. "Colored coating" compositions as used herein is a generic term for surface coatings and refers to compositions that include a vehicle containing a polymer binder component and a pigment or filler dispersed into the vehicle. The colored coating compositions described herein can include an aqueous or non-aqueous vehicle; a polymer binder; a sphere (e.g., a microsphere) selected from porous spheres, polymer spheres, or combinations thereof; and optionally one or more pigments or fillers. The colored coating compositions when dried, exhibit a visible light absorbance, such as visible light absorbance of at least 10%, 20% or greater, 40% or greater, and or 50% or greater. Absorbance or absorptivity is expressed in terms of percentage of incident light that is absorbed into the coating.

The color of the spheres can be tuned to enhance or change the color properties of the colored coating compositions. The terms "tuned," "tunable," "adjust," and "configured" can be used interchangeably and refer to an adjustment to the color of the spheres to change their color properties. By way of example, and not to be considered limiting, such physical characteristics that can be adjusted include the spheres' particle size diameter, particle size distribution, particle shape, the void (pore) diameter within the spheres, porosity, packing density, surface texture, and the degree of order with regards to the spatial arrangement of the voids (pores) in the spheres.

In certain embodiments, the coating compositions comprising the spheres disclosed herein provide UV absorption functionality. The coating compositions can be coated on or incorporated into a substrate. The substrate can include, e.g., plastics, wood, fibers or fabrics, ceramics, glass, metals, and composite products thereof.

Polymer Binder

As described herein, the colored coating compositions include a polymer binder and sphere. The term "binder" (which also may be referred to interchangeably as "resin") refers to polymers that are included in the colored coating composition and that augment or participate in film formation and in the composition of the resultant film.

The specific polymer in the polymer binder can depend on the application of the coating compositions as well as other components of the coating compositions, such as an aqueous or non-aqueous vehicle. In some embodiments, the polymer binder can include a polymer selected from acrylic homopolymers (i.e., a polymer derived from one or more acrylic monomers), styrene-acrylic-based copolymers (i.e., a polymer derived from styrene and one or more (meth)acrylic monomers), styrene-butadiene-based copolymers (i.e., a polymer derived from styrene and one or more diene monomers such as 1,2-butadiene, 1,3-butadiene, 2-methyl-1,3-butadiene, or 2-chloro-1,3-butadiene), styrene-butadiene-styrene block copolymers, vinyl acrylic-based copolymers (i.e., a polymer derived from one or more vinyl ester monomers and one or more (meth)acrylic monomers), ethylene vinyl acetate-based copolymers (i.e., a polymer derived from ethylene and vinyl acetate), a vinyl chloride-based polymer (i.e., a polymer derived from one or more vinyl chloride monomers such as polyvinyl chloride), polychloroprene (i.e., a polymer derived from chlorinated diene monomers), a vinyl alkanoate-based polymer (i.e., a polymer derived from one or more vinyl alkanoate monomers, such as polyvinyl acetate or a copolymer derived from ethylene and vinyl acetate monomers), alkyd resin, polyester resin, polyurethane resin, an acrylic-polyurethane hybrid polymer, silicone resin, petroleum resin, epoxy resin, or blends thereof.

In certain embodiments, the polymer (e.g., an acrylic homopolymer or a styrene-acrylic based copolymer) in the polymer is derived from one or more (meth)acrylate and/or (meth)acrylic acid monomers. The term "(meth)acryl . . . ," as used herein, includes acryl . . . , methacryl . . . , and also includes diacryl . . . , dimethacryl . . . polyacryl . . . and polymethacryl . . . or mixtures thereof. For example, the term "(meth)acrylate monomer" includes acrylate and methacrylate monomers, diacrylate and dimethacrylate monomers, and other polyacrylate and polymethacrylate monomers. Suitable (meth)acrylate monomers include esters of α,β-monoethylenically unsaturated mono- and dicarboxylic acids having 3 to 6 carbon atoms with alkanols having 1 to 12 carbon atoms (e.g. esters of acrylic acid, methacrylic acid, maleic acid, fumaric acid, or itaconic acid, with $C_1$-$C_{12}$, $C_1$-$C_8$, or $C_1$-$C_4$ alkanols such as ethyl, n-butyl, isobutyl and 2-ethylhexyl acrylates and methacrylates, dimethyl maleate and n-butyl maleate). Specific examples of suitable (meth)acrylate monomers for use in the polymer binder include methyl (meth)acrylate, ethyl (meth)acrylate, n-butyl (meth)acrylate, iso-butyl (meth)acrylate, tert-butyl (meth)acrylate, isobutyl (meth)acrylate, n-hexyl (meth)acrylate, 2-ethylhexyl (meth)acrylate, n-heptyl (meth)acrylate, 2-methylheptyl (meth)acrylate, octyl (meth)acrylate, isooctyl (meth)acrylate, n-nonyl (meth)acrylate, isononyl (meth)acrylate, n-decyl (meth)acrylate, isodecyl (meth)acrylate, dodecyl (meth)acrylate, heptadecyl (meth)acrylate, lauryl (meth)acrylate, tridecyl (meth)acrylate, stearyl (meth)acrylate, glycidyl (meth)acrylate, allyl (meth)acrylate, tetrahydrofurfuryl (meth)acrylate, cyclohexyl (meth)acrylate, 2-propylheptyl (meth)acrylate, behenyl (meth)acrylate, or combinations thereof. Other suitable (meth)acrylate monomers include alkyl crotonates, acetoacetoxyethyl (meth)acrylate, acetoacetoxypropyl (meth)acrylate, hydroxyethyl (meth)acrylate, 2-ethoxyethyl (meth)acrylate, 2-methoxy (meth)acrylate, 2-(2-ethoxyethoxy)ethyl (meth)acrylate, 2-phenoxyethyl (meth)acrylate, caprolactone (meth)acrylate, polypropyleneglycol mono(meth)acrylate, polyethyleneglycol (meth)acrylate, benzyl (meth)acrylate, 2,3-di(acetoacetoxy)propyl (meth)acrylate, hydroxypropyl (meth)acrylate, methylpolyglycol (meth)acrylate, 3,4-epoxycyclohexylmethyl (meth)acrylate, 1,6 hexanediol di(meth)acrylate, 1,4 butanediol di(meth)acrylate, or combinations thereof.

The polymer in the polymer binder can include a (meth)acrylate monomer in an amount of 5% or greater by weight, based on the weight of the polymer. For example, the (meth)acrylate monomer can be in an amount of 7% or greater, 10% or greater, 20% or greater, 30% or greater, 40% or greater, 50% or greater, 60% or greater, 65% or greater, 70% or greater, 75% or greater, 80% or greater, 85% or greater, 90% or greater, 95% or greater, or up to 100% by weight, based on the weight of the polymer. In some embodiments, the (meth)acrylate monomer can be in an amount of 100% or less, 95% or less, 90% or less, 85% or less, 80% or less, 75% or less, 70% or less, 65% or less, 60% or less, 55% or less, 50% or less, 45% or less, 40% or less, 35% or less, 30% or less, or 25% or less, by weight, based on the weight of the polymer. The polymer can be derived from any of the minimum values to any of the maximum values by weight described above of the (meth)acrylate monomers. For example, the (meth)acrylate monomer can be in an amount of from greater than 0% to 100%, 20% to 100%, 40% to 95%, 50% to 95%, 65% to 95%, or 65% to 85% by weight, based on the weight of the polymer.

In certain embodiments, the polymer in the polymer binder can be derived from (meth)acrylic acid monomers. Examples of suitable (meth)acrylic acid monomers include α,β-monoethylenically unsaturated mono- and dicarboxylic acids having 3 to 6 carbon atoms. Specific examples of suitable (meth)acrylic acid monomers include acrylic acid, methacrylic acid, maleic acid, fumaric acid, or itaconic acid, crotonic acid, dimethacrylic acid, ethylacrylic acid, allylacetic acid, vinylacetic acid, mesaconic acid, methylenemalonic acid, citraconic acid, or mixtures thereof. The polymer can be derived from 0%, 0.5% or greater, 1.0% or greater, 1.5% or greater, 2.5% or greater, 3.0% or greater, 3.5% or greater, 4.0% or greater, or 5.0% or greater, by weight of a (meth)acrylic acid monomer. In some embodiments, the polymer can be derived 25% or less, 20% or less, 15% or less, or 10% or less, by weight of a (meth)acrylic acid monomer. In some embodiments, the polymer can be derived from 0.5%-25%, from 0.5%-10%, from 1.0%-9%, from 2.0%-8% or from 0.5%-5%, by weight of a monomer.

In certain embodiments, the polymer in the polymer binder includes vinyl aromatic monomers (e.g., styrene). For example, the polymer binder can include a styrene-acrylic-based copolymer, a styrene-butadiene-based copolymer, a styrene-butadiene-styrene block copolymer, or a mixture thereof. Suitable vinyl aromatic monomers for use in the copolymers can include styrene or an alkyl styrene such as α- and p-methylstyrene, α-butylstyrene, p-n-butylstyrene, p-n-decylstyrene, vinyltoluene, and combinations thereof. The vinyl aromatic monomer can be present in an amount of 0% by weight or greater (e.g., 1% or greater, 2% or greater, 5% or greater, 10% or greater, 15% or greater, 20% or greater, 25% or greater, 30% or greater, 40% or greater, 50% or greater, 60% or greater, 65% or greater, 70% or greater, 75% or greater, 80% or greater, or 85% or greater by weight), based on the total weight of monomers from which the polymer is derived. In some embodiments, the vinyl aromatic monomer can be present in the polymer in an amount of 90% by weight or less (e.g., 85% or less, 80% or less, 75% or less, 70% or less, 65% or less, 60% or less, 55% or less, 50% or less, 45% or less, 40% or less, 35% or less, 30% or less, 25% or less, 15% or less, or 10% or less by weight), based on the total weight of monomers from which the polymer is derived. The polymer can be derived from any of the minimum values to any of the maximum values by weight described above of the vinyl aromatic monomer. For example, the polymer can be derived from 0% to 90% by weight (e.g., from 0% to 60%, from 0% to 45%, from 2% to 85%, from 2% to 60%, from 2% to 40%, from 5% to 85%, from 5% to 75%, from 5% to 60%, from 5% to 50%, from 5% to 35%, from 0% to 15%, from 0% to 10%, from 2% to 10%, or from 0% to 5% by weight of vinyl aromatic monomer), based on the total weight of monomers from which the polymer is derived.

When used, the styrene-acrylic-based copolymer can include styrene, a (meth)acrylate monomer, and optionally, one or more additional monomers. In some embodiments, the weight ratio of styrene to the (meth)acrylate monomer in the polymer can be from 1:99 to 99:1, from 10:99 to 99:10, from 5:95 to 95:5, from 5:95 to 80:20, from 20:80 to 80:20, from 5:95 to 70:30, from 30:70 to 70:30, or from 40:60 to 60:40. For example, the weight ratio of styrene to the (meth)acrylate monomer can be 25:75 or greater, 30:70 or greater, 35:65 or greater, or 40:60 or greater. In some examples, the polymer can be a random copolymer, such as a random styrene-(meth)acrylate copolymer.

In certain embodiments, the polymer in the polymer binder can be derived from one or more ethylenically-unsaturated monomers selected from anhydrides of α,β-monoethylenically unsaturated mono- and dicarboxylic acids (e.g. maleic anhydride, itaconic anhydride, and methylmalonic anhydride); acrylamides and alkyl-substituted acrylamides (e.g. (meth)acrylamide, N-tert-butylacrylamide, and N-methyl(meth)acrylamide); (meth)acrylonitrile; 1,2-butadiene (i.e. butadiene); vinyl and vinylidene halides (e.g. vinyl chloride and vinylidene chloride); vinyl esters of $C_1$-$C_{18}$ mono- or dicarboxylic acids (e.g. vinyl acetate, vinyl propionate, vinyl n-butyrate, vinyl laurate and vinyl stearate); $C_1$-$C_4$ hydroxyalkyl esters of $C_3$-$C_6$ mono- or dicarboxylic acids, especially of acrylic acid, methacrylic acid or maleic acid, or their derivatives alkoxylated with from 2 to 50 moles of ethylene oxide, propylene oxide, butylene oxide or mixtures thereof, or esters of these acids with $C_1$-$C_{18}$ alcohols alkoxylated with from 2 to 50 mole of ethylene oxide, propylene oxide, butylene oxide or mixtures thereof (e.g. hydroxyethyl (meth)acrylate, hydroxypropyl (meth)acrylate, and methylpolyglycol acrylate); monomers containing glycidyl groups (e.g. glycidyl methacrylate); linear 1-olefins, branched-chain 1-olefins or cyclic olefins (e.g., ethene, propene, butene, isobutene, pentene, cyclopentene, hexene, and cyclohexene); vinyl and allyl alkyl ethers having 1 to 40 carbon atoms in the alkyl radical, wherein the alkyl radical can possibly carry further substituents such as a hydroxyl group, an amino or dialkylamino group, or one or more alkoxylated groups (e.g., methyl vinyl ether, ethyl vinyl ether, propyl vinyl ether, isobutyl vinyl ether, 2-ethylhexyl vinyl ether, vinyl cyclohexyl ether, vinyl 4-hydroxybutyl ether, decyl vinyl ether, dodecyl vinyl ether, octadecyl vinyl ether, 2-(diethylamino)ethyl vinyl ether, 2-(di-N-butylamino)ethyl vinyl ether, methyldiglycol vinyl ether, and the corresponding allyl ethers); sulfo-functional monomers (e.g., allylsulfonic acid, methallylsulfonic acid, styrenesulfonate, vinylsulfonic acid, allyloxybenzenesulfonic acid, 2-acrylamido-2-methylpropanesulfonic acid, and their corresponding alkali metal or ammonium salts, sulfopropyl acrylate, and sulfopropyl methacrylate); vinylphosphonic acid, dimethyl vinylphosphonate, and other phosphorus monomers (e.g., phosphoethyl (meth)acrylate); alkylaminoalkyl (meth)acrylates or alkylaminoalkyl(meth)acrylamides or quaternization products thereof (e.g., 2-(N,N-dimethylamino)ethyl (meth)acrylate, 3-(N,N-dimethylamino)propyl (meth)acrylate, 2-(N,N,N-trimethylammonium)ethyl (meth)acrylate chloride, 2-dimethylaminoethyl(meth)acrylamide, 3-dimethylaminopropyl(meth)acrylamide, and 3-trimethylammoniumpropyl(meth)acrylamide chloride); allyl esters of $C_1$-$C_{30}$ monocarboxylic acids; N-vinyl compounds (e.g., N-vinylformamide, N-vinyl-N-methylformamide, N-vinylpyrrolidone, N-vinylimidazole, 1-vinyl-2-methylimidazole, 1-vinyl-2-methylimidazoline, N-vinylcaprolactam, vinylcarbazole, 2-vinylpyridine, and 4-vinylpyridine); monomers containing 1,3-diketo groups (e.g., acetoacetoxyethyl (meth)acrylate or diacetone acrylamide); monomers containing urea groups (e.g., ureidoethyl (meth)acrylate, acrylamidoglycolic acid, and methacrylamidoglycolate methyl ether); monoalkyl itaconates; monoalkyl maleates; hydrophobic branched ester monomers; monomers containing silyl groups (e.g., trimethoxysilylpropyl methacrylate), vinyl esters of branched mono-carboxylic acids having a total of 8 to 12 carbon atoms in the acid residue moiety and 10 to 14 total carbon atoms such as, vinyl 2-ethylhexanoate, vinyl neo-nonanoate, vinyl neo-decanoate, vinyl neo-undecanoate, vinyl neo-dodecanoate and mixtures thereof, and copolymerizable surfactant monomers (e.g., those sold under the trademark ADEKA REASOAP).

The polymer in the polymer binder can include one or more crosslinking monomers. Exemplary crosslinking monomers include N-alkylolamides of α,β-monoethylenically unsaturated carboxylic acids having 3 to 10 carbon atoms and esters thereof with alcohols having 1 to 4 carbon atoms (e.g., N-methylolacrylamide and N-methylolmethacrylamide); glycidyl (meth)acrylate; glyoxal based crosslinkers; monomers containing two vinyl radicals; monomers containing two vinylidene radicals; and monomers containing two alkenyl radicals. Other crosslinking monomers include, for instance, diesters of dihydric alcohols with α,β-monoethylenically unsaturated monocarboxylic acids, of which in turn acrylic acid and methacrylic acid can be employed. Examples of such monomers containing two non-conjugated ethylenically unsaturated double bonds can include alkylene glycol diacrylates and dimethacrylates, such as ethylene glycol diacrylate, 1,3-butylene glycol diacrylate, 1,4-butylene glycol diacrylate and propylene glycol diacrylate, divinylbenzene, vinyl methacrylate, vinyl acrylate, allyl methacrylate, allyl acrylate, diallyl maleate, diallyl fumarate, methylenebisacrylamide, and mixtures thereof. In some embodiments, the polymer can include from 0.01% to 5% by weight of the polymer, of the crosslinking agent.

The polymer can have a glass-transition temperature ($T_g$), as measured by differential scanning calorimetry (DSC) using the mid-point temperature as described, for example, in ASTM 3418/82, of from −90° C. to 100° C. In some embodiments, the polymer has a measured $T_g$ of −90° C. or greater (for example, −80° C. or greater, −70° C. or greater, −60° C. or greater, −50° C. or greater, −40° C. or greater, −30° C. or greater, −20° C. or greater, −10° C. or greater, 0° C. or greater, 10° C. or greater, 20° C. or greater, 30° C. or greater, 40° C. or greater, 50° C. or greater, 60° C. or greater, 70° C. or greater, or 80° C. or greater). In some cases, the polymer has a measured $T_g$ of 100° C. or less (e.g., less than 100° C., 90° C. or less, 80° C. or less, 70° C. or less, 60° C. or less, 50° C. or less, 40° C. or less, 30° C. or less, 25° C. or less, 20° C. or less, 10° C. or less, 0° C. or less, −10° C. or less, −20° C. or less, −25° C. or less, −30° C. or less, −35° C. or less, −40° C. or less, −45° C. or less, or −50° C. or less). In certain embodiments, the polymer has a measured $T_g$ of from −90° C. to 90° C., from −90° C. to 50° C., from −90° C. to 40° C., from −90° C. to 30° C., from −90° C. to 25° C., −90° C. to 0° C., −90° C. to −10° C., from −80° C. to 25° C., from −80° C. to 10° C., from −80° C. to 0° C., from −80° C. to −10° C., from −60° C. to 30° C., from −60° C. to 25° C., from −60° C. to 0° C., from −60° C. to less than 0° C. or from −40° C. to less than 0° C.

The polymer binder can be formed from an aqueous dispersion, for example, an aqueous latex dispersion. In some embodiments, the polymer binder can include an aqueous latex dispersion of an acrylic homopolymer, a vinyl-aromatic-acrylic polymer, a vinyl-acrylic polymer, a vinyl chloride polymer, an acrylic-polyurethane hybrid polymer, a vinyl alkanoate polymer, or a combination thereof.

Typical polymer binders used in colored coating compositions for applications such as paints and inks are known in the art. For example, paint and ink formulations can include polymer binders commercially available under the trade name ACRONAL® (available from BASF), JONCRYL® (available from BASF), RHOPLEX® (available from The Dow Chemical Company), ROVACE® (available from The Dow Chemical Company), and EVOQ UE® (available from The Dow Chemical Company).

Spheres

As described herein, the colored coating compositions include a sphere (e.g., microsphere). The term "sphere" encompasses any particle, particularly, although not essentially, having a largest dimension or mean diameter of at least 1 µm, e.g., from 1 micron to 20 microns, from 1 micron to 10 microns, or from 1 µm to 5 µm, suitable for imparting a color other than black or white to a colored coating composition described herein. The spheres can absorb and reflect visible light. In some embodiments, the spheres can reflect light having a wavelength in the visible portion of the electromagnetic spectrum, from about 400 nm to about 800 nm. For example, the color "blue" or "blue-violet" has a local maximum reflectance in the spectral region of from about 390 nm to about 490 nm. The color "green" has a local maximum reflectance in the spectral region of from about 491 nm to about 570 nm. The color "red" has a local maximum reflectance in the spectral region of from about 621 nm to about 740 nm. The color "cyan" is obtained by the addition of the blue and green light and has a local maximum reflectance in the spectral region of from about 390 nm to about 490 nm and 491 nm to about 570 nm. The color "magenta" is obtained by the addition of the blue and red light and has a local maximum reflectance in the spectral region of from about 390 nm to about 490 nm and 621 nm to about 740 nm. The color "yellow" has a local maximum reflectance in the spectral region of from about 560 nm to about 590 nm.

Color has three characteristics—hue, intensity, and value. "Hue" refers to a gradation, tint, or variety of a color. "Intensity", "chroma", and "saturation" are used interchangeably to refer to the strength or sharpness of a color. "Value" refers to a degree of lightness or darkness in a color. The spheres can provide a desired color for the colored coatings compositions.

The structural color of the spheres is an important advantage over traditional pigments that are based on light absorption through electronic effects. For conventional pigments, each color requires the use of one or more specific compounds. The spheres, however, can employ a structural color mechanism that enables the use of a single material in order to achieve a wide range of spectral colors through the tailoring of the periodic spacing in the structure.

Spheres Formed from Polymer Spheres

The spheres (e.g., microspheres) can be formed from an inorganic material, an organic material, or a combination thereof. In some examples, the spheres are derived from polymer spheres formed from a multimodal distribution of polymer particles (e.g., nanoparticles). The polymer spheres can include a polymer selected from poly(meth)acrylic acids, poly(meth)acrylates, polystyrenes, polyacrylamides, polyethylene, polypropylene, polylactic acids, polyacrylonitriles, derivatives thereof, salts thereof, blends thereof, or copolymers thereof. In some cases, the polymer spheres can include copolymers such as polystyrene/acrylic acid, polystyrene/poly(ethylene glycol) methacrylate or polystyrene/styrene sulfonate.

As discussed herein, the colors that result from the spheres can be selected by alterations to the structure of the pigments, allowing one material to exhibit various colors throughout the visible spectrum, in some cases, with no change to the chemical nature of the material itself. Without wishing or intending to be bound by theory, it is believed that the color of the spheres formed from the polymer spheres described herein can be influenced, at least in part, by the assembly of the polymer particles into regular, periodic arrays. In particular, the polymer spheres can be produced from a system where polymer particles self-assemble into regular, periodic arrays of polymer spheres. Monodisperse, polymer particles typically pack into regular, periodic arrays. Polydisperse, polymer particles may pack into regular or disordered arrays. Other assembly methods can also be used to produce different packing arrangements of the polymer particles by altering the sphere characteristics, such as size disparity, surface charge, geometry, the assembly process, or a combination of these factors. For example, at high velocities, polymer particles may not self-assemble into ordered arrays as they are not able to re-order into lower-energy conformations before other particles pin the polymer spheres into place, often in an undesirable conformation. This increases the disorder of the sphere and introduces defects in the lattice. Well-ordered polymer particles can be prepared at slower velocities that allows the formation of a periodic array of spheres. The velocity at which the polymer particles assemble is dependent on the technique used to form the spheres.

In some embodiments, introducing disorder in a periodic structure of the spheres can lead to changes in its spectral behaviors, such as angle dependent versus angle independent colors. Specifically, angle-independent color (i.e., structural colors that remain the same regardless of the angle which the sphere is viewed from) may be achieved in spheres having a disordered structure. Such disordered structure may have polymer particles assembled into a state that exhibits no readily perceptible organization, regularity, or orientation. Consequently, colors resulting from the spheres having a disordered structure are observably the same to a human naked eye when the surface with the coated spheres is viewed from different angles.

Angle-dependent color (i.e., the color or the sphere changes upon variation of the angle of incident light, or as the viewing angle of the observer shifts) may be achieved in spheres having an ordered structure. As a result of these ordered structures, different colors may be observed when the surface is viewed from different angles. For example, at one angle, the observed color may be green, at another angle, the observed color may be blue. The observed colors at different angles may also differ in terms of their tones (darkness or lightness), for example, green and light green.

The polymer particles in the polymer spheres can have an average diameter of 50 nm or greater, 75 nm or greater, 100 nm or greater, 120 nm or greater, 150 nm or greater, 170 nm or greater, 200 nm or greater, 250 nm or greater, 300 nm or greater, 350 nm or greater, 400 nm or greater, 450 nm or greater, 500 nm or greater, 550 nm or greater, 600 nm or greater, 650 nm or greater, 700 nm or greater, 750 nm or greater, 800 nm or greater, 850 nm or greater, 900 nm or greater, 950 nm or greater, or 1000 nm or greater. For example, the polymer particles in the polymer spheres can have an average diameter of from 50 nm to 1 µm, from 50 nm to 750 nm, from 100 nm to 1 µm, from 100 nm to 750 nm, from 100 nm to 500 nm, from 100 nm to 400 nm, or from 200 nm to 400 nm.

The polymer spheres are generally formed from a multimodal distribution of polymer particles, for example, bimodal, trimodal, quadrimodal, and such the like, with respect to the size of the polymer particles. In some embodiment, a first population of polymer particles in the polymer spheres can have an average diameter of from 50 nm to 750 nm, from 100 nm to 750 nm, from 100 nm to 500 nm, from 100 nm to 400 nm, or from 200 nm to 400 nm. In some embodiment, a second population of polymer particles in the polymer spheres can have an average diameter of from 500 nm to 1 μm, from 500 nm to 750 nm, from 600 nm to 900 nm, or from 750 nm to 1 μm.

In embodiments where the polymer spheres are formed from a bimodal distribution of polymer particles, the populations of polymer particles can exhibit a difference in particle size of 20 nm or greater, such as 30 nm or greater, 40 nm or greater, 50 nm or greater, 60 nm or greater, 70 nm or greater, 90 nm or greater, or 100 nm or greater. In some embodiments, the populations of polymer particles can exhibit a difference in particle size of from 20 nm to 999 nm, from 20 nm to 500 nm, from 20 nm to 200 nm, or from 40 nm to 200 nm.

The polymer spheres can have an average diameter of from 1 μm to 20 μm, from 1 μm to 15 μm, from 1 μm to 10 μm, from 1 μm to 7.5 μm, from 1 μm to 5 μm, from 2 μm to 5 μm, 3 μm to 20 μm, from 3 μm to 15 μm, from 3 μm to 10 μm, from 3 μm to 7.5 μm, from 3 μm to 5 μm, from 3.5 μm to 5 μm, from 4 μm to 5 μm, from 3 μm to 4.5 μm, or from 3 μm to 4 μm. The average particle diameter (also referred to herein as average particle size) of the polymer spheres can be determined by scanning electron microscopy (SEM) or transmission electron microscopy (TEM). Average particle size is synonymous with D50, meaning half of the population resides above this point, and half below.

Spheres Formed from Porous Metal Oxide Spheres

The polymer particles (e.g., nanoparticles) used to form the polymer spheres (e.g., microspheres) can also be used as sacrificial templates to create spheres (e.g., microspheres) derived from inorganic oxides. Particularly, in some examples, the spheres can be derived from porous metal oxide spheres (e.g., microspheres) formed from metal oxide particles (e.g., nanoparticles).

The term "metal oxide" refers to oxygen containing species of various metals, such as silicon, titanium, aluminum, zirconium, cerium, iron, zinc, indium, tin, chromium, antimony, bismuth, cobalt, gallium, lanthanum, molybdenum, neodymium, nickel, niobium, vanadium, or combinations thereof. In specific examples, the metal oxide particles can include a metal oxide selected from silica, titania, alumina, zirconia, ceria, iron oxides, zinc oxide, indium oxide, tin oxide, chromium oxide, or combinations thereof. More specifically, the metal oxide particles can include $SiO_2$, $TiO_2$, $Ti_2O_3$, $Al_2O_3$, or $Fe_2O_3$. The porous metal oxide spheres can include one or more metal oxides in an amount of 60% by weight or greater. For example, the porous metal oxide spheres can include one or more metal oxides in an amount of 65% or greater, 70% or greater, 75% or greater, 80% or greater, 85% or greater, 90% or greater, 95% or greater, 97% or greater, 98% or greater, 99% or greater, or up to 100% by weight of the porous sphere. In some embodiments, the porous metal oxide spheres can include one or more metal oxides in an amount of 65% up to 100% by weight (e.g., from 65% to 99%, from 70% to 99%, from 80% to 99%, from 90% to 99%, from 70% to 90%, or from 75% to 95% by weight), based on the weight of the porous metal oxide sphere.

The ability to template the spheres derived from porous metal oxide spheres with sacrificial polymer particles enables a high degree of tunability for color properties. The polymer particles can be synthesized using an emulsion polymerization technique, which allows for variability in the size of the polymer particles that are produced. Since the size of the sacrificial polymer particles determines the final size of the pores in the spheres, the reflective properties and consequently the color of the spheres can vary greatly.

The porous metal oxide spheres are porous. The term "porous" as used herein refers to one or more interconnected or non-interconnected pores, voids, spaces, or interstices that allow air or liquid to pass through. In general, porosity, void diameter, and particle size diameter of spherical spheres can be tuned to enable the spheres to exhibit various colors over whole range of the visible regions.

In some embodiments, the porous metal oxide spheres can have an average pore diameter of 200 nm or greater, 250 nm or greater, 300 nm or greater, 350 nm or greater, 400 nm or greater, 450 nm or greater, 500 nm or greater, 550 nm or greater, 600 nm or greater, 650 nm or greater, 700 nm or greater, 750 nm or greater, or up to 800 nm or greater. In some embodiments, the porous metal oxide spheres can have an average pore diameter of 800 nm or less, 750 nm or less, 700 nm or less, 650 nm or less, 600 nm or less, 550 nm or less, 500 nm or less, 450 nm or less, 400 nm or less, 350 nm or less, 300 nm or less, 250 nm or less, or 200 nm or less. The porous metal oxide spheres can have an average pore diameter from any of the minimum values to any of the maximum values described above of the porous metal oxide spheres. For example, the porous metal oxide spheres can have an average pore diameter of from 200 nm to 800 nm, from 200 nm to 600 nm, from 200 nm to 400 nm, from 250 nm to 400 nm, or from 250 nm to 350 nm. The average pore diameter can be determined by electron microscopy.

As discussed herein, the average pore size (or pore diameter) of the porous metal oxide spheres can vary, depending on the size of the sacrificial polymer particles used to create the pore size (although some "shrinkage" or compaction may occur upon polymer removal, providing pore sizes somewhat smaller than the original sacrificial polymer particles). However, spherical monodispersed sacrificial polymer particles can be employed to create a substantially uniform and unimodal distribution of pore sizes. In other cases, a multimodal distribution of sacrificial polymer particles can be employed to create a multimodal distribution, such as a bimodal distribution, of pore sizes. In general, however, the pore size of the porous metal oxide spheres is nano-scaled, such as from about 200 nm to about 400 nm. While the pore size significantly influences the color expressed by the spheres, the shape and size distribution of pores as well as of the spheres can affect the color.

The term "porosity" as used herein refers to a measure of the empty spaces (or voids or pores) in the spheres and is a ratio of the volume of voids to total volume of the mass of the porous metal oxide spheres between 0 and 1, or as a percentage between 0 and 100%. Average porosity of the porous metal oxide spheres means the total pore volume, as a fraction of the volume of the entire porous metal oxide sphere. Porosity can be measured by means known in the art such as by mercury porosimetry analysis. The porous metal oxide spheres can contain uniform or non-uniform pore diameters, a result of the sacrificial polymer particles being spherical and monodisperse or polydisperse.

The porous metal oxide spheres may contain a high degree of porosity due to removal of the sacrificial polymer template described herein. In some embodiments, the porous metal oxide spheres can have an average porosity of 0.10 or greater. For example, the porous metal oxide spheres can have an average porosity of 0.15 or greater, 0.18 or greater, 0.20 or greater, 0.25 or greater, 0.28 or greater, 0.30 or greater, 0.35 or greater, 0.40 or greater, 0.45 or greater, 0.50 or greater, 0.55 or greater, 0.60 or greater, 0.65 or greater, 0.70 or greater, 0.75 or greater, 0.80 or greater, 0.85 or greater, or up to 0.90. In certain embodiments, the porous metal oxide spheres can have an average porosity of 0.90 or less, 0.85 or less, 0.80 or less, 0.75 or less, 0.70 or less, 0.65 or less, 0.60 or less, 0.55 or less, 0.50 or less, 0.45 or less, 0.40 or less, 0.35 or less, 0.30 or less, 0.25 or less, 0.20 or less, or 0.15 or less. The porous metal oxide spheres can have a porosity from any of the minimum values to any of the maximum values described above. For example, the porous metal oxide spheres can have an average porosity of from 0.10 to 0.90, from 0.10 to 0.80, from 0.15 to 0.80, from 0.20 to 0.70, from 0.20 to 0.60, from 0.45 to 0.70, from 0.40 to 0.65, from 0.45 to 0.65, or from 0.45 to 0.55.

The porosity of the porous metal oxide spheres can be such that the porous metal oxide spheres have a solid core (center) where the porosity is in general towards the exterior surface of the sphere. In other embodiments, the porous metal oxide spheres can have a hollow core where a major portion of the porosity is towards the interior of the porous sphere. In other embodiments, the porosity can be distributed throughout the volume of the porous metal oxide spheres. In further embodiments, the porosity can exist as a gradient, with higher porosity towards the exterior surface of the porous metal oxide spheres and lower or no porosity (solid) towards the center; or with lower porosity towards the exterior surface and with higher or complete porosity (hollow) towards the center.

The pore size and pore distribution of the porous metal oxide spheres can be ordered (periodic structures) or disordered (random structures). Angle-dependent color may be achieved in the coatings using porous metal oxide spheres having an ordered pore size and pore distribution. An ordered pore size and pore distribution may be achieved for example with the use of monodisperse sacrificial polymer particles during preparation of the porous metal oxide spheres or when a step of drying the liquid droplets to provide porous spheres is performed slowly, allowing the metal oxide particles to become ordered. Angle-independent reflectance may be achieved in the coatings using porous metal oxide spheres having a disordered pore size distribution. A disordered pore size distribution may be achieved for example when a step of drying the liquid droplets is performed quickly, not allowing the metal oxide particles to become ordered.

The porous metal oxide spheres can have an average diameter of from 1 µm to 20 µm, from 1 µm to 15 µm, from 1 µm to 10 µm, from 1 µm to 7.5 µm, from 1 µm to 5 µm, such as from 2 µm to 5 µm, 3 µm to 20 µm, from 3 µm to 15 µm, from 3 µm to 10 µm, from 3 µm to 7.5 µm, from 3 µm to 5 µm, from 3.5 µm to 5 µm, from 4 µm to 5 µm, from 3 µm to 4.5 µm, or from 3 µm to 4 µm. The average particle diameter (also referred to herein as average particle size) of the porous metal oxide spheres can be determined by scanning electron microscopy (SEM) or transmission electron microscopy (TEM). Average particle size is synonymous with D50, meaning half of the population resides above this point, and half below.

Colored Coating Compositions

Provided herein are colored coating compositions comprising a polymer binder and a sphere (e.g., microspheres) as described herein. In some embodiments, the colored coating composition include spheres (e.g., microspheres) derived from porous metal oxide spheres (e.g., microspheres) having an average diameter of from 1 µm to 20 µm, from 1 µm to 10 µm, from 1 µm to 5 µm, or from 3 µm to 5 µm; an average porosity of 0.20 or greater (e.g., from 0.20 to 0.90, from 0.20 to 0.80, from 0.20 to 0.70, from 0.40 to 0.65, from 0.45 to 0.65, or from 0.45 to 0.55); and an average pore diameter of from 200 nm to 800 nm (e.g., 200 nm to 400 nm, from 200 nm to 350 nm, or from 250 nm to 350 nm). The colored coating compositions when dried, can exhibit a visible absorbance, such as within a wavelength of from 400 to 800 nm. The visible absorbance of the colored coating compositions with respect to the color can be dependent on the physical characteristics (such as particle size, porosity, and pore size) of the spheres, as discussed herein.

The colored coating composition can include the sphere in an amount from greater than 0% by weight to 99.9% by weight (e.g., 0.1% or greater, 0.5% or greater, 1% or greater, 2.5% or greater, 5% or greater, 7% or greater, 10% or greater, 12.5% or greater, 15% or greater, 20% or greater, 22% or greater, 25% or greater, 30% or greater, 35% or greater, 40% or greater, 45% or greater, 50% or greater, 55% or greater, 60% or greater, 65% or greater, 70% or greater, 75% or greater, 80% or greater, 85% or greater, 90% or greater, 95% or greater, or up to 99.9% by weight), based on the total dry weight of the colored coating composition. The colored coating composition can include the sphere in an amount of 99.9% by weight or less, 99% by weight or less, 98% by weight or less, 95% by weight or less, 90% by weight or less, 85% by weight or less, 80% by weight or less, 75% by weight or less, 70% by weight or less, 65% by weight or less, 60% by weight or less, 55% by weight or less, 50% by weight or less, 45% by weight or less, 40% by weight or less, 35% by weight or less, 30% by weight or less, 25% by weight or less, 20% by weight or less, 15% by weight or less, 10% by weight or less, 8% by weight or less, 7% by weight or less, 6% by weight or 5% by weight or less, 4% by weight or less, 3% by weight or less, 2% by weight or less, or 1% by weight or less), based on the total dry weight of the colored coating composition. The colored coating composition can include the sphere in an amount from 0.1% to 99.9% by weight, from 0.5% by weight to 99% by weight, from 0.5% by weight to 95% by weight, from 1% by weight to 90% by weight, from 5% by weight to 99.9% by weight, from 10% by weight to 90% by weight, from 15% by weight to 85% by weight, based on the total dry weight of the colored coating composition.

The colored coating composition can include the polymer binder in an amount from greater than 0% by weight to 99.9% by weight (e.g., 0.1% or greater, 0.5% or greater, 1% or greater, 2.5% or greater, 5% or greater, 7% or greater, 10% or greater, 12.5% or greater, 15% or greater, 20% or greater, 22% or greater, 25% or greater, 30% or greater, 35% or greater, 40% or greater, 45% or greater, 50% or greater, 55% or greater, 60% or greater, 65% or greater, 70% or greater, 75% or greater, 80% or greater, 85% or greater, 90% or greater, 95% or greater, or up to 99.9% by weight), based on the total dry weight of the colored coating composition. The colored coating composition can include the polymer binder in an amount of 99.9% by weight or less, 99% by weight or less, 98% by weight or less, 95% by weight or less, 90% by weight or less, 85% by weight or less, 80% by weight or less, 75% by weight or less, 70% by weight or less, 65% by weight or less, 60% by weight or less, 55% by weight or less, 50% by weight or less, 45% by weight or less, 40% by weight or less, 35% by weight or less, 30% by weight or less, 25% by weight or less, 20% by weight or less, 15% by weight or less, 10% by weight or less, 8% by weight or less, 7% by weight or less, 6% by weight or 5% by weight or less, 4% by weight or less, 3% by weight or less, 2% by weight or less, or 1% by weight or less), based on the total dry weight of the colored coating composition. The colored coating composition can include the polymer binder in an amount from 0.1% by weight to 99.9% by weight, from 0.5% by weight to 99% by weight, from 0.5% by weight to 95% by weight, from 1% by weight to 90% by weight, from 5% by weight to 99.9% by weight, from 10% by weight to 90% by weight, from 15% by weight to 85% by weight, based on the total dry weight of the colored coating composition.

The colored coating compositions can include additional components. For example, the colored coating compositions can include an additive such as a pigment dispersant, an inorganic or organic filler, an additional pigment, a pigment extender, a thickener, a defoamer, a surfactant, a biocide, an adhesion enhancer, a coalescing agent, a film forming aid, a flame retardant, a stabilizer, a curing agent, a flow agent, a leveling agent, a light stabilizer, a wetting agent, a hardener, a tackifier, an anti-settling aid, a texture-improving agent, an antiflocculating agent, or a combination thereof. The additive can be added to impart certain properties to the coating compositions such as thickness, texture, handling, fluidity, smoothness, whiteness, increased density or weight, decreased porosity, increased opacity, flatness, glossiness, decreased blocking resistance, barrier properties, and the like.

In some embodiments, the colored coating compositions include a mineral filler and/or a pigment. When present, the mineral filler and/or pigment can be selected from $TiO_2$ (in both anatase and rutile forms), clay (aluminum silicate), $CaCO_3$ (in both ground and precipitated forms), aluminum trihydrate, fly ash, or aluminum oxide, silicon dioxide, magnesium oxide, talc (magnesium silicate), barytes (barium sulfate), zinc oxide, zinc sulfite, sodium oxide, potassium oxide, and mixtures thereof. Examples of commercially available titanium dioxide pigments are KRONOS® 2101, KRONOS® 2310, available from Kronos WorldWide, Inc., TI-PURE® R-900, available from DuPont, or TIONA® AT1 commercially available from Millennium Inorganic Chemicals. Titanium dioxide is also available in concentrated dispersion form. An example of a titanium dioxide dispersion is KRONOS® 4311, also available from Kronos Worldwide, Inc. Suitable pigment blends of mineral fillers are sold under the marks MINEX® (oxides of silicon, aluminum, sodium and potassium commercially available from Unimin Specialty Minerals), CELITE® (aluminum oxide and silicon dioxide commercially available from Celite Company), and ATOMITE® (commercially available from Imerys Performance Minerals). Exemplary fillers also include clays such as attapulgite clays and kaolin clays including those sold under the ATTAGEL® and ANSILEX® marks (commercially available from BASF Corporation). Additional fillers include nepheline syenite, (25% nepheline, 55% sodium feldspar, and 20% potassium feldspar), feldspar (an aluminosilicate), diatomaceous earth, calcined diatomaceous earth, talc (hydrated magnesium silicate), aluminosilicates, silica (silicon dioxide), alumina (aluminum oxide), mica (hydrous aluminum potassium silicate), pyrophyllite (aluminum silicate hydroxide), perlite, baryte (barium sulfate), wollastonite (calcium metasilicate), and combinations thereof. More preferably, the colored coating compositions can include $TiO_2$, $CaCO_3$, and/or a clay. In some embodiments, the colored coating composition does not include a pigment and/or mineral filler other than the sphere.

When present, the mineral filler and/or pigment can comprise particles having a number average particle size of 50 microns or less (e.g., 45 microns or less, 40 microns or less, 35 microns or less, 30 microns or less, 25 microns or less, 20 microns or less, 18 microns or less, 15 microns or less, 10 microns or less, 8 microns or less, or 5 microns or less). In some embodiments, the mineral filler and/or pigment can have a number average particle size of 10 microns or greater, 12 microns or greater, 15 microns or greater, 20 microns or greater, 25 microns or greater, 30 microns or greater, 35 microns or greater, 40 microns or greater, or 45 microns or greater. In some embodiments, the mineral filler can have a number average particle size of from 10 microns to 50 microns, from 10 microns to 35 microns, or from 10 microns to 25 microns.

The mineral filler and/or pigment, if present, can be present in an amount of 1% or greater, based on the total weight of the colored coating composition. For example, the mineral filler and/or pigment can be present in an amount of from 1% to 85%, from 10% to 85%, from 15% to 75% or from 15% to 65% by weight, based on the total weight of the colored coating composition. The colored coating compositions can include spheres and a combination of mineral fillers and pigments in weight ratios of 90:10, 80:20, 70:30, 60:40, 50:50, 40:60, 30:70, 20:80 or 10:90. In some cases, the colored coating composition can include from 0.1% to 90% by weight (e.g., from 1% by weight to 60% by weight, from 1% by weight to 55% by weight, from 1% by weight to 50% by weight, or from 5% by weight to 50% by weight) of spheres and/or mineral fillers and/or pigments.

Examples of suitable pigment dispersing agents for use in the colored coating compositions are polyacid dispersants and hydrophobic copolymer dispersants. Polyacid dispersants are typically polycarboxylic acids, such as polyacrylic acid or polymethacrylic acid, which are partially or completely in the form of their ammonium, alkali metal, alkaline earth metal, ammonium, or lower alkyl quaternary ammonium salts. Hydrophobic copolymer dispersants include copolymers of acrylic acid, methacrylic acid, or maleic acid with hydrophobic monomers. In certain embodiments, the composition includes a polyacrylic acid-type dispersing agent, such as Pigment Disperser N, commercially available from BASF SE.

Examples of suitable thickeners include hydrophobically modified ethylene oxide urethane (HEUR) polymers, hydrophobically modified alkali soluble emulsion (HASE) polymers, hydrophobically modified hydroxyethyl celluloses (HMHECs), hydrophobically modified polyacrylamide, and combinations thereof. HEUR polymers are linear reaction products of diisocyanates with polyethylene oxide end-capped with hydrophobic hydrocarbon groups. HASE polymers are homopolymers of (meth)acrylic acid, or copolymers of (meth)acrylic acid, (meth)acrylate esters, or maleic acid modified with hydrophobic vinyl monomers. HMHECs include hydroxyethyl cellulose modified with hydrophobic alkyl chains. Hydrophobically modified polyacrylamides include copolymers of acrylamide with acrylamide modified with hydrophobic alkyl chains (N-alkyl acrylamide). In certain embodiments, the coating composition includes a hydrophobically modified hydroxyethyl cellulose thickener. Other suitable thickeners that can be used in the coating compositions can include acrylic copolymer dispersions sold under the STEROCOLL™ and LATEKOLL™ trademarks from BASF Corporation, Florham Park, N.J.; urethanes thickeners sold under the RHEOVIS™ trademark (e.g., Rheovis PU 1214); hydroxyethyl cellulose; guar gum; carrageenan; xanthan; acetan; konjac; mannan; xyloglucan; and mixtures thereof. The thickeners can be added to the colored coating compositions as an aqueous dispersion or emulsion, or as a solid powder.

Suitable coalescing aids, which aid in film formation during drying, include ethylene glycol monomethyl ether, ethylene glycol monobutyl ether, ethylene glycol monoethyl ether acetate, ethylene glycol monobutyl ether acetate, diethylene glycol monobutyl ether, diethylene glycol monoethyl ether acetate, dipropylene glycol monomethyl ether, propylene glycol n-butyl ether, dipropylene glycol n-butyl ether, 2,2,4-trimethyl-1,3-pentanediol monoisobutyrate, or combinations thereof. In some embodiments, the coating compositions can include one or more coalescing aids such as propylene glycol n-butyl ether and/or dipropylene glycol n-butyl ether. The coalescing aids, if present, can be present in an amount of from greater than 0% to 30%, based on the dry weight of the polymer binder. For example, the coalescing aid can be present in an amount of from 10% to 30%, from 15% to 30% or from 15% to 25%, based on the dry weight of the polymer binder. In some embodiments, the coalescing aid can be included in coating compositions comprising a high Tg polymer binder (that is a polymer having a Tg greater than ambient temperature (e.g., 20° C.)). In these embodiments, the coalescing aid can be present in an effective amount to provide coating compositions having a Tg less than ambient temperature (e.g., 20° C.). In some embodiments, the compositions do not include a coalescing aid.

Defoamers serve to minimize frothing during mixing and/or application of the colored coating compositions. Suitable defoamers include organic defoamers such as mineral oils, silicone oils, and silica-based defoamers. Exemplary silicone oils include polysiloxanes, polydimethylsiloxanes, polyether modified polysiloxanes, or combinations thereof. Exemplary defoamers include BYK®-035, available from BYK USA Inc., the TEGO® series of defoamers, available from Evonik Industries, the DREWPLUS® series of defoamers, available from Ashland Inc., and FOAMASTER® NXZ, available from BASF Corporation.

Plasticizers can be added to the colored coating compositions to reduce the glass transition temperature ($T_g$) of the compositions below that of the drying temperature to allow for good film formation. Suitable plasticizers include diethylene glycol dibenzoate, dipropylene glycol dibenzoate, tripropylene glycol dibenzoate, butyl benzyl phthalate, or a combination thereof. Exemplary plasticizers include phthalate based plasticizers. The plasticizer can be present in an amount of from 1% to 15%, based on the dry weight of the polymer binder. For example, the plasticizer can be present in an amount of from 5% to 15% or from 7% to 15%, based on the dry weight of the polymer binder. In some embodiments, the plasticizer can be present in an effective amount to provide coating compositions having a Tg less than ambient temperature (e.g., 20° C.). In some embodiments, the colored coating compositions do not include a plasticizer.

Suitable surfactants include nonionic surfactants and anionic surfactants. Examples of nonionic surfactants are alkylphenoxy polyethoxyethanols having alkyl groups of about 7 to about 18 carbon atoms and having from about 6 to about 60 oxyethylene units; ethylene oxide derivatives of long chain carboxylic acids; analogous ethylene oxide condensates of long chain alcohols, and combinations thereof. Exemplary anionic surfactants include ammonium, alkali metal, alkaline earth metal, and lower alkyl quaternary ammonium salts of sulfosuccinates, higher fatty alcohol sulfates, aryl sulfonates, alkyl sulfonates, alkylaryl sulfonates, and combinations thereof. In certain embodiments, the colored coating composition comprises a nonionic alkylpolyethylene glycol surfactant, such as LUTENSOL® TDA 8 or LUTENSOL® AT-18, commercially available from BASF SE. In certain embodiments, the composition comprises an anionic alkyl ether sulfate surfactant, such as DISPONIL® FES 77, commercially available from BASF SE. In certain embodiments, the colored coating composition comprises an anionic diphenyl oxide disulfonate surfactant, such as CALFAX® DB-45, commercially available from Pilot Chemical.

Examples of suitable pH modifying agents include bases such as sodium hydroxide, potassium hydroxide, amino alcohols, monoethanolamine (MEA), diethanolamine (DEA), 2-(2-aminoethoxy)ethanol, diisopropanolamine (DIPA), 1-amino-2-propanol (AMP), ammonia, and combinations thereof. In some embodiments, the compositions do not include an ammonia-based pH modifier. The pH of the dispersion can be greater than 7. For example, the pH can be 7.5 or greater, 8.0 or greater, 8.5 of greater, or 9.0 or greater.

Suitable biocides can be incorporated to inhibit the growth of bacteria and other microbes in the coating composition during storage. Exemplary biocides include 2-[(hydroxymethyl)amino]ethanol, 2-[(hydroxymethyl) amino]2-methyl-1-propanol, o-phenylphenol, sodium salt, 1,2-benzisothiazolin-3-one, 2-methyl-4-isothiazolin-3-one (MIT), 5-chloro2-methyland-4-isothiazolin-3-one (CIT), 2-octyl-4-isothiazolin-3-one (OIT), 4,5-dichloro-2-n-octyl-3-isothiazolone, as well as acceptable salts and combinations thereof. Suitable biocides also include biocides that inhibit the growth of mold, mildew, and spores thereof in the coating. Examples of mildewcides include 2-(thiocyanomethylthio)-benzothiazole, 3-iodo-2-propynyl butyl carbamate, 2,4,5,6-tetrachloroisophthalonitrile, 2-(4-thiazolyl)benzimidazole, 2-N-octyl4-isothiazolin-3-one, diiodomethyl p-tolyl sulfone, as well as acceptable salts and combinations thereof. In certain embodiments, the colored coating composition contains 1,2-benzisothiazolin-3-one or a salt thereof. Biocides of this type include PROXEL® BD20, commercially available from Arch Chemicals, Inc. The biocide can alternatively be applied as a film to the coating and a commercially available film-forming biocide is Zinc Omadine® commercially available from Arch Chemicals, Inc.

Exemplary co-solvents and humectants include ethylene glycol, propylene glycol, diethylene glycol, and combinations thereof. Exemplary dispersants can include sodium polyacrylates in aqueous solution such as those sold under the DARVAN trademark by R.T. Vanderbilt Co., Norwalk, Conn.

The colored coating compositions described herein can have a total solids content of from 20% to 99% by weight (e.g., 25% to 95% by weight, 35% to 90% by weight, or 45% to 90%) by weight).

The colored coating compositions can be used for several applications, including in architectural coatings such as an architectural paint, industrial coatings, or inks, which are further discussed herein. In some examples, the colored coating compositions can be provided as a paint, such as an aqueous based paint, a semi-gloss paint, or a high gloss paint. In certain embodiments, the coating formulation can comprise less than or equal to 50 grams per liter of volatile organic compounds.

Generally, colored coatings are formed by applying the colored coating composition as described herein to a surface and allowing the coating to dry to form a dried coating, such as a film. The surface can be, for example, wood, glass, metal, wood, plastic, asphalt, concrete, ceramic material or another coating layer applied on such a surface. Specific surfaces include wall, PVC pipe, brick, mortar, carpet, granule, pavement, ceiling tile, sport surface, exterior insulation and finish system (EIFS), polyurethane foam surface, polyolefin surface, ethylene-propylene diene monomer (EPDM) surface, roof, vinyl, and another coating surface (in the case of recoating applications).

The colored coating composition can be applied to a surface by any suitable coating technique, including spraying, rolling, brushing, or spreading. The colored coating composition can be applied in a single coat, or in multiple sequential coats (e.g., in two coats or in three coats) as required for a particular application. Generally, the colored coating composition is allowed to dry under ambient conditions. However, in certain embodiments, the coating composition can be dried, for example, by heating and/or by circulating air over the coating.

The thickness of the resultant colored coating compositions can vary depending upon the application of the coating. For example, the coating can have a dry thickness of at least 0.5 microns, (e.g., at least 10 microns, at least 15 microns, at least 20 microns, at least 25 microns, at least 30 microns, at least 40 microns, at least 50 microns, at least 60 microns, at least 75 microns, at least 85 microns, at least 100 microns, at least 150 microns, at least 200 microns, at least 250 microns, at least 300 microns, at least 350 microns, at least 400 microns, at least 450 microns, or at least 500 microns. In some instances, the colored coating compositions has a dry thickness of less than 500 microns (e.g., 450 microns or less, 400 microns or less, 350 microns or less, 300 microns or less, 250 microns or less, 200 microns or less, 150 microns or less, 100 microns or less, 75 microns or less, 50 microns or less, 40 microns or less, 30 microns or less, 25 microns or less, or 20 microns or less. In some embodiments, the colored coating compositions has a dry thickness of between 0.5 microns and 500 microns, from 0.5 microns to 250 microns, from 0.5 microns to 75 microns, or from 5 microns to 75 microns.

As described herein, the colored coating compositions when dried, exhibit visible light absorbance. The coatings may also exhibit UV reflectance, visible light reflectance, IR reflectance, or a combination thereof.

Methods of Making the Spheres

Methods of making the colored coating compositions are described, for example in U.S. Ser. No. 16/126,338 (or PCT/US2018/050168) and Ser. No. 16/126,346 (or PCT/US2018/050175), which are incorporated herein by reference in their entirety.

Briefly, the porous metal oxide spheres can be prepared with the use of a sacrificial polymeric particle. For example, an aqueous colloid dispersion containing sacrificial polymer particles and a metal oxide is prepared, the polymer particles typically being nano-scaled. The aqueous colloidal dispersion is mixed with a continuous oil phase, for instance within a microfluidic device or vibrating nozzle techniques, to produce a water-in-oil emulsion. Emulsion aqueous droplets are prepared, collected and dried to form spheres containing sacrificial polymer particles and metal oxide. The sacrificial polymer particles (e.g., nanoparticles or nanospheres) are then removed, for instance via calcination, to provide spherical, metal oxide particles (spheres), typically micron-scaled containing a high degree of porosity and pores typically nano-scaled. The porous metal oxide spheres may contain uniform pore diameters, a result of the sacrificial polymer particles being spherical and monodisperse. In some cases, the porous metal oxide spheres are sintered, resulting in a continuous solid structure which is thermally and mechanically stable. Suitable sacrificial polymer particles include thermoplastic polymers. For example, sacrificial polymer particles are selected from the group consisting of poly(meth)acrylic acid, poly(meth)acrylates, polystyrenes, polyacrylamides, polyvinyl alcohol, polyvinyl acetate, polyesters, polyurethanes, polyethylene, polypropylene, polylactic acid, polyacrylonitrile, polyvinyl ethers, derivatives thereof, salts thereof, copolymers thereof and combinations thereof. For example, the sacrificial polymer particles are selected from the group consisting of polymethyl methacrylate, polyethyl methacrylate, poly(n-butyl methacrylate), polystyrene, poly(chloro-styrene), poly(alpha-methylstyrene), poly(N-methylolacrylamide), styrene/methyl methacrylate copolymer, polyalkylated acrylate, polyhydroxyl acrylate, polyamino acrylate, polycyanoacrylate, polyfluorinated acrylate, poly(N-methylolacrylamide), polyacrylic acid, polymethacrylic acid, methyl methacrylate/ethyl acrylate/acrylic acid copolymer, styrene/methyl methacrylate/acrylic acid copolymer, polyvinyl acetate, polyvinylpyrrolidone, polyvinylcaprolactone, polyvinylcaprolactam, derivatives thereof, salts thereof, and combinations thereof. The wt/wt (weight/weight) ratio of sacrificial polymer particles to metal oxide can be from 0.1:1 to 10:1.

Sacrificial polymer removal may be performed for example via calcination, pyrolysis or with a solvent (solvent removal). Calcination is performed in some embodiments at temperatures of at least about 200° C., at least about 500° C., at least about 1000° C., from about 200° C. to about 1200° C. or from about 200° C. to about 700° C. The calcining can be for a suitable period, e.g., from about 0.1 hour to about 12 hours or from about 1 hour to about 8.0 hours. In other embodiments, the calcining can be for at least about 0.1 hour, at least about 1 hour, at least about 5 hours or at least about 10 hours.

The polymer spheres can be prepared from polydisperse polymer particles comprising forming a liquid solution or dispersion of monodisperse polymer particles; forming at least one further liquid solution or dispersion of monodisperse polymer particles; mixing each of the solutions or dispersions together; forming droplets of the mixture; and drying the droplets to provide polymer spheres comprising polydisperse polymer particles. A microwave or an oven can be used for drying the droplets which can be done under vacuum or in the presence of a desiccant or a combination thereof.

In an alternate embodiment, the solutions or dispersions can be mixed together and spray-dried to provide the polymer spheres.

Methods of Making the Coating Compositions

The polymer binder in the colored coating compositions can be prepared by any polymerization method known in the art. In some embodiments, the polymer binder can be prepared by a dispersion, a mini-emulsion, or an emulsion polymerization.

Methods of making the colored coating compositions can include mixing the polymer binder with one or more or the spheres described herein.

By way of non-limiting illustration, examples of certain embodiments of the present disclosure are given below.

EXAMPLES

Example 1: Preparation of Colored Coatings

Colored coatings can be prepared by mixing a sphere having a particle diameter of from 3 to 5 microns and voids of from 400 to 800 nm with a polymer binder, water, and optionally a defoamer, a pigment dispersant agent, one or multiple rheology modifying polymers, a light stabilizer, a wetting agent, a fungicide/mildewcide agent, an inorganic pigment extender, and an organic or inorganic light absorbing pigment.

It is believed that the spheres in the colored coatings will provide permanence, durability and full color representation.

Embodiments of the Colored Coating Compositions

Colored coating compositions comprising a polymer binder and a sphere (e.g., microspheres) selected from porous metal oxide spheres (e.g., microspheres) formed from metal oxide particles (e.g., nanoparticles) and having an average porosity of from 0.20 to 0.90 or from 0.10 to 0.80; polymer spheres (e.g., microspheres) formed from a multimodal distribution of polymer particles (e.g., nanoparticles); or mixtures thereof, wherein the colored coating composition when dried, exhibits visible light absorbance at a wavelength range from 400 nm to 800 nm.

The colored coating compositions of the preceding embodiments, wherein the sphere exhibits an angle-dependent structural color.

The colored coating compositions of the preceding embodiments, wherein the sphere exhibits an angle-independent structural color.

The colored coating compositions of any one of the preceding embodiments, wherein the polymer binder comprises a polymer selected from acrylic homopolymers, styrene-acrylic-based copolymers, styrene-butadiene-based copolymers, styrene-butadiene-styrene block copolymers, vinyl acrylic-based copolymers, ethylene vinyl acetate-based copolymers, polychloroprene, alkyd resin, polyester resins, polyurethane resins, silicone resins, petroleum resins, epoxy resins, or blends thereof.

The colored coating compositions of any one of the preceding embodiments, wherein the polymer binder is present in an amount of from greater than 0% to 99.9% by weight, from 5% to 99.9% by weight, or from 10% to 95% by weight, based on a dry weight of the coating composition.

The colored coating compositions of any one of the preceding embodiments, wherein the sphere has an average particle size diameter of from 1 micron to 20 microns, from 1 micron to 10 microns, from 1 micron to 5 microns, or from 3 microns to 5 microns and exhibits a structural color visible to the human eye.

The colored coating compositions of any one of the preceding embodiments, wherein the sphere comprises the porous metal oxide spheres.

The colored coating compositions of any one of the preceding embodiments, wherein the porous metal oxide spheres comprise from 60% to 99.9% by weight metal oxide, based on a total weight of the porous metal oxide spheres.

The colored coating compositions of any one of the preceding embodiments, wherein the metal oxide is selected from the group consisting of silica, titania, alumina, zirconia, ceria, iron oxides, zinc oxide, and combinations thereof, such as titania or silica.

The colored coating compositions of any one of the preceding embodiments, wherein the porous metal oxide spheres have an average porosity of from 0.20 to 0.70, from 0.40 to about 0.65, or from 0.45 to about 0.55.

The colored coating compositions of any one of the preceding embodiments, wherein the porous metal oxide spheres have a multimodal distribution of pore sizes, such as a bimodal distribution of pore sizes.

The colored coating compositions of any one of the preceding embodiments, wherein the porous metal oxide spheres comprise a unimodal distribution of pore sizes.

The colored coating compositions of any one of the preceding embodiments, wherein the porous metal oxide spheres have an average pore diameter from 200 nm to 800 nm, from 200 nm to 600 nm, from 200 nm to 400 nm, or from 200 nm to 350 nm.

The colored coating compositions of any one of the preceding embodiments, wherein the porous metal oxide spheres comprise an average diameter of from 1 micron to 20 microns, from 1 micron to 10 microns, or from 3 microns to 5 microns; an average porosity of from 0.20 to 0.70, or from 0.45 to 0.55; and an average pore diameter of from 200 nm to 400 nm.

The colored coating compositions of any one of the preceding embodiments, wherein the sphere comprises the polymer spheres.

The colored coating compositions of any one of the preceding embodiments, wherein the polymer spheres are formed from a multimodal distribution of pore sizes, such as a bimodal distribution of pore sizes.

The colored coating compositions of any one of the preceding embodiments, wherein the polymer spheres comprise a polymer selected from the group consisting of poly(meth)acrylic acid, poly(meth)acrylates, polystyrenes, polyacrylamides, polyethylene, polypropylene, polylactic acid, polyacrylonitrile, blends thereof, salts thereof, and copolymers thereof.

The colored coating compositions of any one of the preceding embodiments, wherein the colored coating composition further comprises one or more pigments or mineral fillers, such as those selected from clay, kaolin, mica, titanium dioxide, talc, natural silica, synthetic silica, natural silicates, synthetic silicates, feldspars, nepheline syenite, wollastonite, diatomite, barite, glass, and calcium carbonate, bentonite, attapulgite, zeolite, or mixtures thereof.

The colored coating compositions of any one of the preceding embodiments, wherein the sphere and the one or more pigments or mineral fillers are present in the composition from greater than 0% to 90% by weight, or from 0.1% to 60% by weight, based on a total weight of the colored coating composition.

The colored coating compositions of any one of the preceding embodiments, further comprising a pigment dispersant, an inorganic or organic filler, a pigment extender, an adhesion enhancer, a film forming aid, a defoamer, a thickener, a light stabilizer, a wetting agent, a biocide, a tackifier, or a combination thereof.

The colored coating compositions of any one of the preceding embodiments, wherein the colored coating composition is an aqueous composition.

An architectural coating composition comprising a colored coating composition according to any one of the preceding embodiments.

The architectural coating composition of the preceding embodiments, wherein the architectural coating composition is a paint composition.

The architectural coating composition of any one of the preceding embodiments, wherein the paint composition is selected from an aqueous based paint or an oil-based paint, such as selected from an industrial paint or an architectural paint for interior and exterior applications.

A coating or film obtained by applying a colored coating composition according to any one of the preceding embodiments on a substrate.

The coating or film of any one of the preceding embodiments, having a thickness of from 0.5 to 500 microns, from 5 to 75 microns, or 30 microns or less.

The coating or film of any one of the preceding embodiments, wherein the substrate is an architectural structure, glass, metal, wood, plastic, concrete, vinyl, or ceramic material or another coating layer applied on such a substrate.

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated. The term "comprising", and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than in the examples, or where otherwise noted, all numbers expressing quantities of ingredients, reaction conditions, and so forth used in the specification and claims are to be understood at the very least, and not as an attempt to limit the application of the doctrine of equivalents to the scope of the claims, to be construed in light of the number of significant digits and ordinary rounding approaches.

What is claimed is:

1. An architectural colored coating composition comprising:
    a polymer binder; and
    a sphere selected from porous metal oxide spheres formed from metal oxide particles and having an average porosity of from 0.10 to 0.90; polymer spheres formed from a multimodal distribution of polymer particles; or mixtures thereof,
    wherein the sphere has an average particle size diameter from 1 micron to 10 microns and exhibits a structural color visible to the human eye,
    wherein the architectural colored coating composition when dried, exhibits visible light absorbance at a wavelength range from 400 nm to 800 nm.

2. The architectural colored coating composition of claim 1, wherein the polymer binder comprises a polymer selected from acrylic homopolymers, styrene-acrylic-based copolymers, styrene-butadiene-based copolymers, styrene-butadiene-styrene block copolymers, vinyl acrylic-based copolymers, ethylene vinyl acetate-based copolymers, polychloroprene, alkyd resin, polyester resins, polyurethane resins, silicone resins, petroleum resins, epoxy resins, or blends thereof.

3. The architectural colored coating composition of claim 1, wherein the sphere exhibits an angle-dependent structural color.

4. The architectural colored coating composition of claim 1, wherein the sphere exhibits an angle-independent structural color.

5. A colored coating composition comprising:
    a polymer selected from acrylic homopolymers, styrene-acrylic-based copolymers, styrene-butadiene-based copolymers, styrene-butadiene-styrene copolymers, vinyl acrylic copolymers, ethylene vinyl acetate copolymers, polychloroprene, alkyd resin, polyester resins, polyurethane resins, silicone resins, petroleum resins, epoxy resins, blends thereof, or copolymers thereof; and
    a sphere selected from porous metal oxide spheres formed from metal oxide particles, polymer spheres formed from a multimodal distribution of polymer particles, or a mixture thereof,
    wherein the sphere has an average particle size diameter from 1 micron to 10 microns and exhibits an angle-independent structural color.

6. The colored coating composition of claim 1, wherein the colored coating composition is an aqueous composition.

7. The colored coating composition of claim 1, wherein the sphere comprises the porous metal oxide spheres.

8. The colored coating composition of claim 7, wherein the porous metal oxide spheres have an average porosity from 0.40 to about 0.65.

9. The colored coating composition of claim 7, wherein the porous metal oxide spheres comprise a multimodal distribution of pore sizes, or a bimodal distribution of pore sizes.

10. The colored coating composition of claim 7, wherein the porous metal oxide spheres comprise a unimodal distribution of pore sizes.

11. The colored coating composition of claim 8, wherein the porous metal oxide spheres comprise an average pore diameter from 200 nm to 350 nm.

12. The colored coating composition of claim 7, wherein the porous metal oxide spheres comprise from 60% to 99.9% by weight metal oxide, based on a total weight of the porous metal oxide spheres.

13. The colored coating composition of claim 12, wherein the metal oxide is selected from the group consisting of silica, titania, alumina, zirconia, ceria, iron oxides, zinc oxide, and combinations thereof.

14. The colored coating composition of claim 1, wherein the sphere comprises the polymer spheres.

15. The colored coating composition of claim 14, wherein the polymer spheres comprise a polymer selected from the group consisting of poly(meth)acrylic acid, poly(meth)acrylates, polystyrenes, polyacrylamides, polyethylene, polypropylene, polylactic acid, polyacrylonitrile, blends thereof, salts thereof, and copolymers thereof.

16. The colored coating composition of claim 1, wherein the colored coating composition further comprises one or more pigments or mineral fillers, selected from clay, kaolin, mica, titanium dioxide, talc, natural silica, synthetic silica, natural silicates, synthetic silicates, feldspars, nepheline syenite, wollastonite, diatomite, barite, glass, and calcium carbonate, bentonite, attapulgite, zeolite, or mixtures thereof.

17. The colored coating composition of claim 1, wherein the colored coating composition does not include a pigment in addition to the sphere.

18. A paint comprising the colored coating composition of claim 1, wherein the paint is selected from an aqueous based paint or an oil-based paint.

19. A film derived from a colored coating composition of claim 1, after application to a substrate as a coating and after drying.

20. The film of claim 19, wherein the film exhibits a visible light absorbance at a wavelength from 400 nm to 800 nm of at least 20%.

\* \* \* \* \*